(12) United States Patent
Jones et al.

(10) Patent No.: US 7,804,783 B2
(45) Date of Patent: Sep. 28, 2010

(54) AUTOMATIC DETECTION AND TESTING OF NEW NETWORKING CONNECTIONS

(76) Inventors: David Jones, 1301 1st Ave., Apt. 1101, Seattle, WA (US) 98101; Sean O. Lyndersay, 19 Ward St., Apt. #8, Seattle, WA (US) 98109

( * ) Notice: Subject to any disclaimer, the term of this patent is extended or adjusted under 35 U.S.C. 154(b) by 899 days.

(21) Appl. No.: 11/024,296

(22) Filed: Dec. 23, 2004

(65) Prior Publication Data
US 2006/0143299 A1    Jun. 29, 2006

(51) Int. Cl.
H04J 1/16    (2006.01)
(52) U.S. Cl. ............... 370/248; 370/230; 370/331; 709/221
(58) Field of Classification Search ........... 370/230, 370/248, 463, 389, 401, 241, 331; 709/220–224
See application file for complete search history.

(56) References Cited

U.S. PATENT DOCUMENTS

| | | | |
|---|---|---|---|
| 6,295,556 B1 | 9/2001 | Falcon et al. | |
| 6,449,642 B2 | 9/2002 | Bourke-Dunphy et al. | |
| 6,606,613 B1 | 8/2003 | Altschuler et al. | |
| 6,711,682 B1 | 3/2004 | Capps | |
| 6,744,450 B1 | 6/2004 | Zimniewicz et al. | |
| 6,801,777 B2 * | 10/2004 | Rusch ............... | 455/452.2 |
| 6,802,061 B1 | 10/2004 | Parthasarathy et al. | |
| 7,369,854 B2 * | 5/2008 | Gallagher et al. ........ | 455/436 |
| 2001/0023446 A1 * | 9/2001 | Balogh ............... | 709/229 |
| 2002/0082927 A1 * | 6/2002 | Borenstein et al. ........ | 705/21 |
| 2006/0020525 A1 * | 1/2006 | Borelli et al. ............ | 705/34 |
| 2006/0084417 A1 * | 4/2006 | Melpignano et al. ...... | 455/418 |

FOREIGN PATENT DOCUMENTS

WO    WO-2004/031488 A1    4/2004

OTHER PUBLICATIONS

European Search Report for Application No. EP 05 11 2306 dated Feb. 8, 2006.
Anonymous: "So Wird's Gemacht: Mit T-DSL und Windows XP Home Edition gemeinsam ins Internet (Teil 3)", http://support.microsoft.com/kb/814538/de.
Anonymous: "So wird's gemacht: Windoes XP DFU und T-Online", http://support.microsoft.com/kb/813638/de.

* cited by examiner

*Primary Examiner*—Huy D Vu
*Assistant Examiner*—Dady Chery
(74) *Attorney, Agent, or Firm*—Marshall, Gerstein & Borun LLP

(57) ABSTRACT

A new connection wizard automatically detects available networking hardware, as well as networks that are available. The wizard then presents the user with a list of choices, i.e., different connection types that they can set up. This list of options is based on the hardware and networks that were detected initially. Thus, the wizard will only present the user with the connection types that can actually be utilized. Once the user has selected a connection type and completed the configuration through the wizard, the wizard will automatically test the connection and report success or failure to the user.

17 Claims, 11 Drawing Sheets

AUTOMATIC DETECTION AND TESTING OF NEW NETWORKING CONNECTIONS

FIELD OF THE INVENTION

This invention pertains generally to networking and, more particularly, to a system for aiding a user in configuring a network connection.

BACKGROUND OF THE INVENTION

As the use of computers has become increasing widespread in home and business environments alike, the need to interconnect such computers has also become important. For example, in a home environment, a user may wish to connect to a home network, such as a wireless network including for example one or more computers and perhaps one or more peripheral devices as well. Alternatively the user may wish to connect to a wide area network (WAN), such as the Internet. Similarly, in business contexts, users often need to use networks to communicate internally as well as to communicate externally, such as to customers, suppliers, etc. In any case, the user needs to initially configure a connection to the appropriate network, i.e., via the appropriate software and hardware.

However, the typical computer user, especially in the home environment but also in other environments, is not a computer expert. To such users, setting up a functioning network connection often requires skills or knowledge that they do not possess. The typical connection configuration process involves the use of a separate software entity sometimes referred to as a "wizard," that guides the user through some basic aspects of the configuration. However, for unsophisticated users, this is not enough, and the configuration attempt fails. There are two primary causes of such failure. The first is that the user has attempted to connect using nonexistent networking hardware. For example, an Ethernet connection cannot be successfully established if the computer in question lacks the appropriate networking card. A secondary cause of failure is that appropriate hardware and network exist, but the user configures the connection incorrectly.

A system of user guidance is needed that solves these shortcomings and others inherent in prior systems of network connection configuration.

BRIEF SUMMARY OF THE INVENTION

Embodiments of the invention solve the shortcomings inherent in prior techniques by determining what network connections are possible and presenting only those options to the user. In addition, user guidance and connection testing techniques are used to ensure successful network connection configuration.

In an embodiment of the invention, when a user launches the "New Connection Wizard" the system automatically detects available networking hardware and networks that are available. The wizard then presents the user with a list of choices, i.e., different connection types that they can set up. This list of options is based on the hardware and networks that were detected initially. Thus, the wizard will only present the user with the connection types that can actually be utilized; for instance the wizard will not display a WiFi option if there are no wireless networks in range or if WiFi networking equipment not installed.

Once the user has selected a connection type and completed the configuration through the wizard, the wizard will automatically test the connection. To test the connection, the system connects silently in the background, tests for Internet connectivity, disconnects in the background, and reports success or failure to the user The result of the foregoing methodology according to an embodiment of the invention is that the user is not asked to determine hardware or network type(s) but instead the system presents "smart choices" to the user, i.e. connections that they can actually create. Moreover, the new connection created by the user will be tested to ensure correct functionality. Thus, the typical user will be more successful in creating desired network connections, increasing user satisfaction and decreasing user failure and support calls.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

Embodiments of the invention pertain generally to assisting a user in network connection configuration. As noted above, even with the guidance of a traditional "wizard," users are often having difficulty in successfully configuring a connection to a network. In overview, embodiments of the invention aid the user by presenting a list of smart choices, i.e. choices for which a network connection could be established, and then testing the configured connection to assure success.

Figure 1:
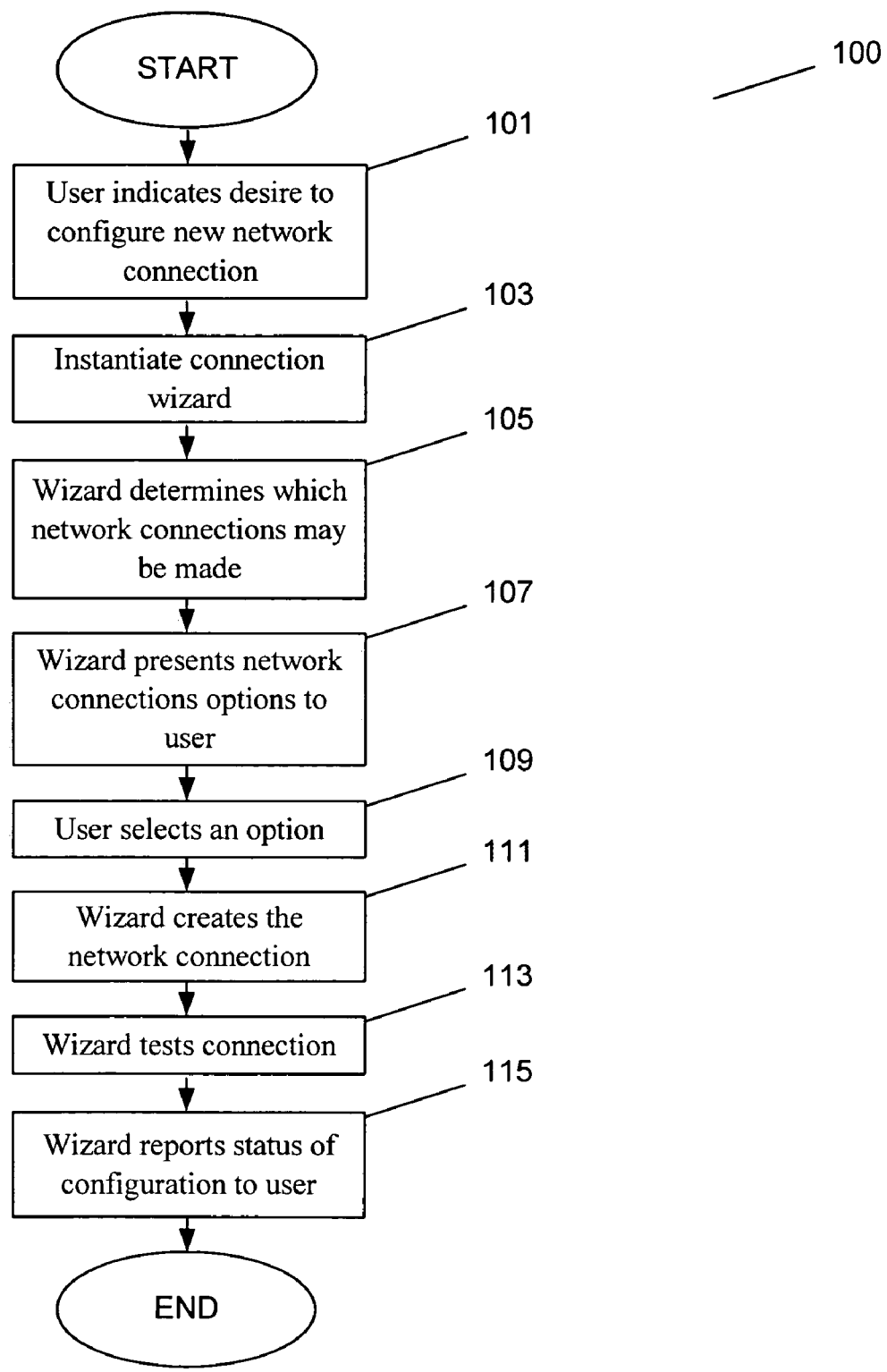
FIG. 1 illustrates a flow chart of the configuration process according to an embodiment of the invention.

FIG. 1 illustrates a flow chart of the configuration process to aid the reader in understanding the more complex diagrams to come. At step 101 of the flow chart 100, the user indicates a desire to configure a new connection, such as by running an application that requires a network connection, etc. At step 103, the connection wizard is instantiated, such as by the operating system. The wizard may also be manually started by the user in an embodiment of the invention, such as by selecting an appropriate menu item or otherwise.

At step 105, the wizard determines which network connections may be made. This entails in an embodiment of the invention detecting networking hardware and connectivity (i.e. a network for the hardware to connect to). Hardware types include, but are not limited to modem hardware, wireless 802.11 and/or 802.16 (Wi-Max) networking hardware, Bluetooth networking hardware, GSM/CDMA network hardware, and Ethernet network hardware. Network types include but are not limited to Ethernet (requiring no authentication), WiFi (802.11 networks), 802.16 (Wi-Max) networks, GSM/CDMA networks, Bluetooth PAN networks, and dial-up modem connections.

In step 107, the wizard presents network connections options to the user, wherein the options include only those networking mechanisms for which a network connection is possible. For example, if WiFi connection hardware exists but there is no wireless network in range, then a WiFi option is not presented to the user. The user selects an option in step 109. Subsequently in step 111, the wizard creates the network connection, querying the user when necessary, and then in step 113 the wizard tests the connection just made to ensure that the connection has been successfully configured. Finally, in step 115, the wizard reports to the user the status of the configuration attempt. For example, the wizard may indicate "connection successfully configured" or "connection configuration failed." In the event that the configuration attempt fails, the wizard also indicates in an embodiment of the invention one or more reasons for the failure where possible.

Figure 2:
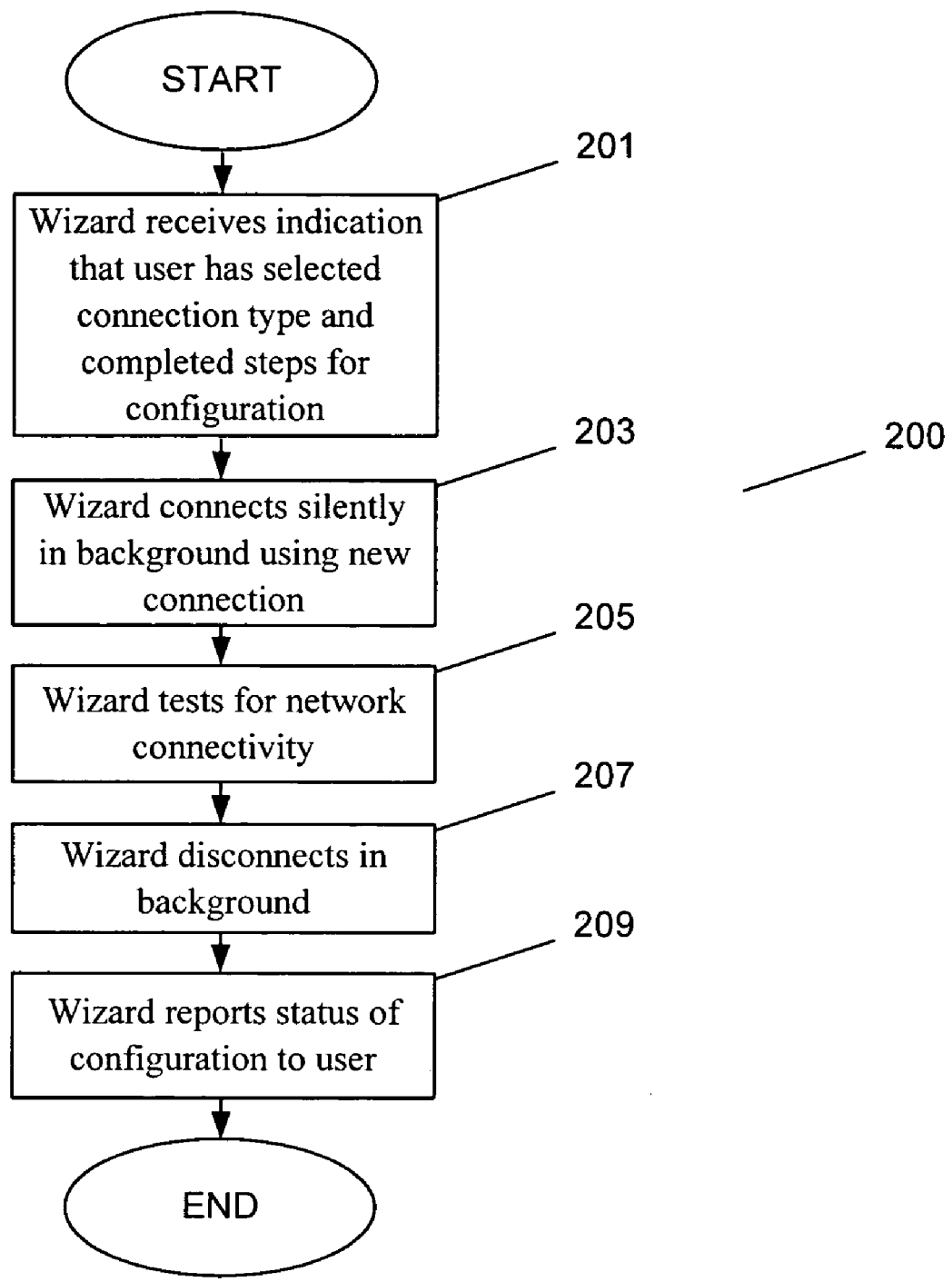
FIG. 2 is a flow chart representing the process executed by the wizard in testing a connection according to an embodiment of the invention.

FIG. 2 is a flow chart representing the process executed by the wizard in testing the connection. In step 201 of flowchart 200, the wizard receives an indication that the user has selected a connection type and completed the steps for configuration. At step 203, the wizard connects silently in the background using the new connection. At step 205, the wizard tests the connection for Internet (or other network) connectivity. The wizard then disconnects in the background in step 207, and reports to the user as discussed above in step 209. In the event that failure occurs in configuring the connection, the user may be lead by the wizard through a series of diagnostic steps to correct the problem. If no connection mechanisms have been detected, then the user is prompted to manually configure a connection. In addition, in an embodiment of the invention, the user may choose to manually configure a connection even when the wizard does detect connection options.

Figure 3:
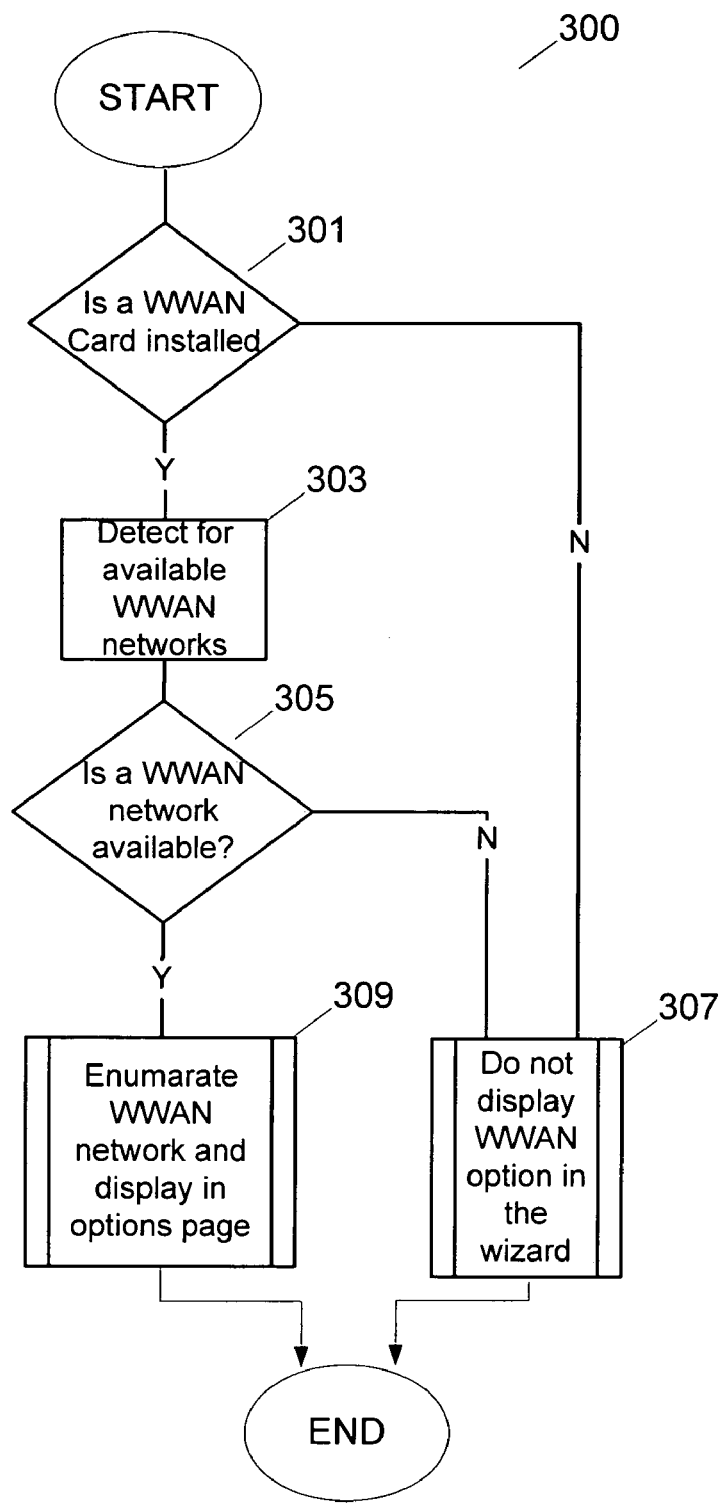
FIG. 3 is a flow chart illustrating a process used by the wizard for determining whether a GPRS connection is possible according to an embodiment of the invention.

The process of determining whether a connection is possible with respect to five network types is illustrated in the flow charts of FIGS. 3-7. In FIG. 3, a process is illustrated for determining whether a GPRS connection is possible. At step 301 of flow chart 300, the process determines whether a WWAN card is installed. If no such card is installed, the process flows to step 307. Otherwise the process continues to step 303, where it detects whether any WWAN network is available. At decision 305, if no WWAN network is available, the process flows to step 307, whereat the WWAN option is not displayed to the user by the wizard. Otherwise, the process flows to step 309, whereat the WWAN connection option is displayed by the wizard to the user.

Figure 4:
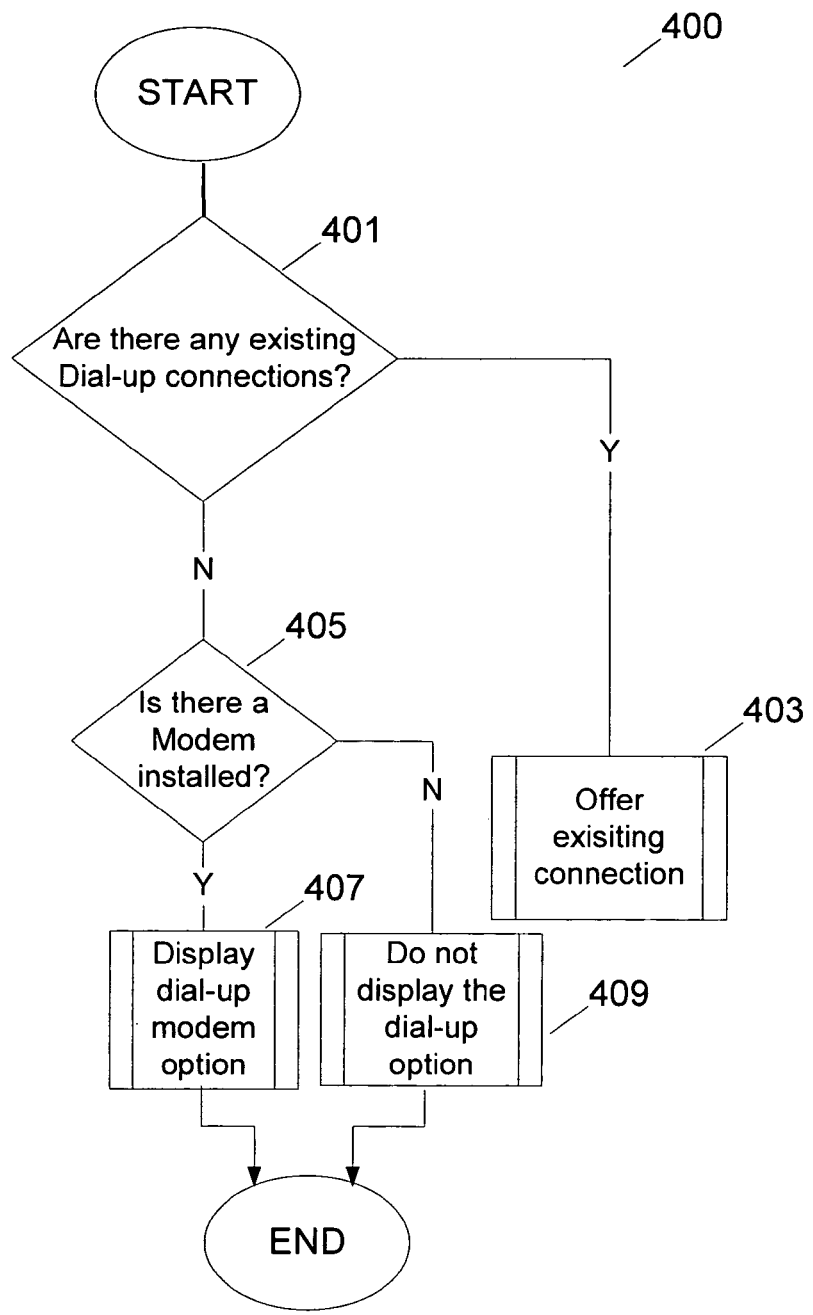
FIG. 4 is a flow chart illustrating a process used by the wizard for determining whether a modem connection is possible according to an embodiment of the invention.

In FIG. 4, a process is illustrated for determining whether a modem connection is possible. Initially at step 401 of the flow chart 400, the wizard determines whether there is an existing dial-up connection. If so, the process flows to step 403, whereat the existing connection is offered to the user. If it is determined at step 401 that there is not an existing dial-up connection, the process flows to step 405, whereat it is determined whether a modem is installed. If a modem is installed, the process flows to step 407, whereat the dial-up connection option is displayed to the user. If instead it is determined that a modem is not installed, the process flows to step 409, whereat a dial-up connection option is not displayed to the user.

Figure 5:
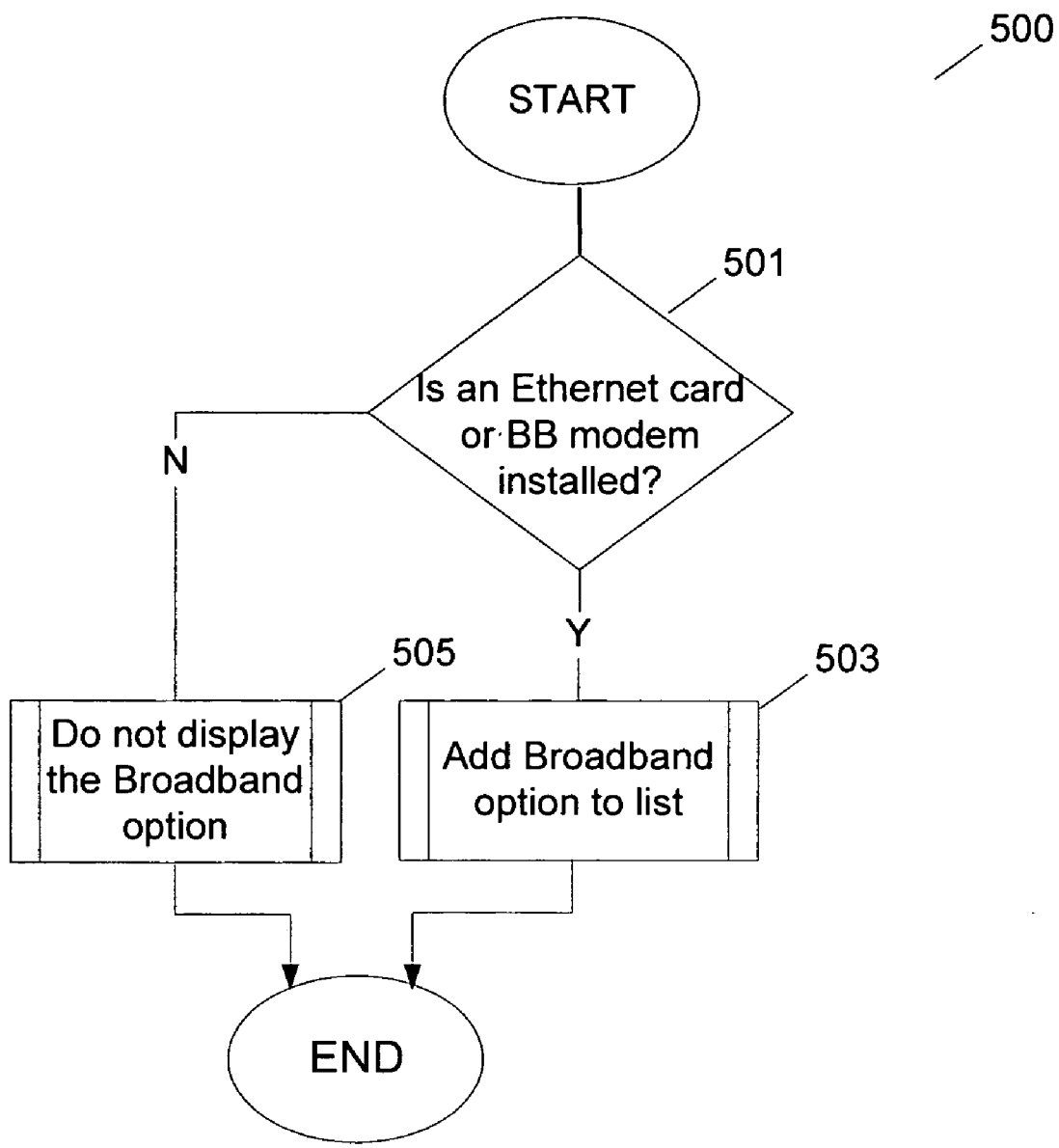
FIG. 5 is a flow chart illustrating a process used by the wizard for determining whether an Ethernet connection is possible according to an embodiment of the invention.

In FIG. 5, a process is illustrated for determining whether an Ethernet connection is possible. In step 501 of flow chart 500, the wizard first determines whether an Ethernet card or Broadband modem is installed on the user's machine. If it is determined that an Ethernet card and/or Broadband modem is installed on the user's machine, then at step 503 the wizard displays a broadband connection option to the user. If instead it is determined that neither an Ethernet card nor a Broadband modem is installed on the user's machine, then at step 505 the wizard does not display a broadband connection option to the user.

Figure 6:
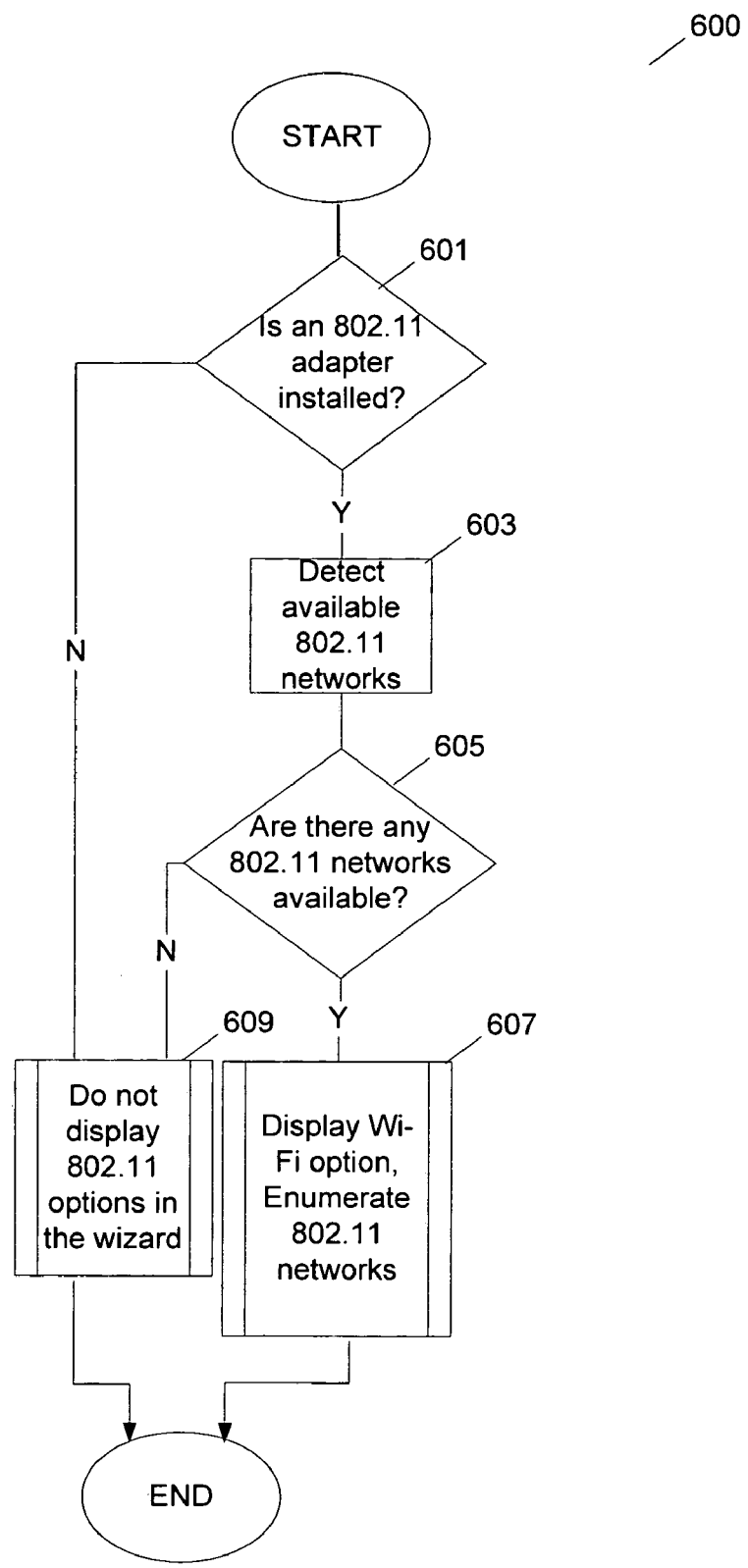
FIG. 6 is a flow chart illustrating a process used by the wizard for determining whether an 802.11 connection is possible according to an embodiment of the invention.

In FIG. 6, a process is illustrated for determining whether an 802.11 connection is possible. Initially at step 601, the wizard determines whether an 802.11 adapter is installed on the user's machine. If it is determined that an 802.11 adapter is not installed on the user's machine, the n the process branches to step 609 whereat the wizard does not display an 802.11 connection option to the user. Otherwise, the process flows to step 603, whereat the wizard detects any available 802.11 networks. At decision 605, if it is determined that at least one 802.11 network is available, then the process flows to step 607, whereat the wizard displays an 802.11 connection option to the user.

Figure 7:
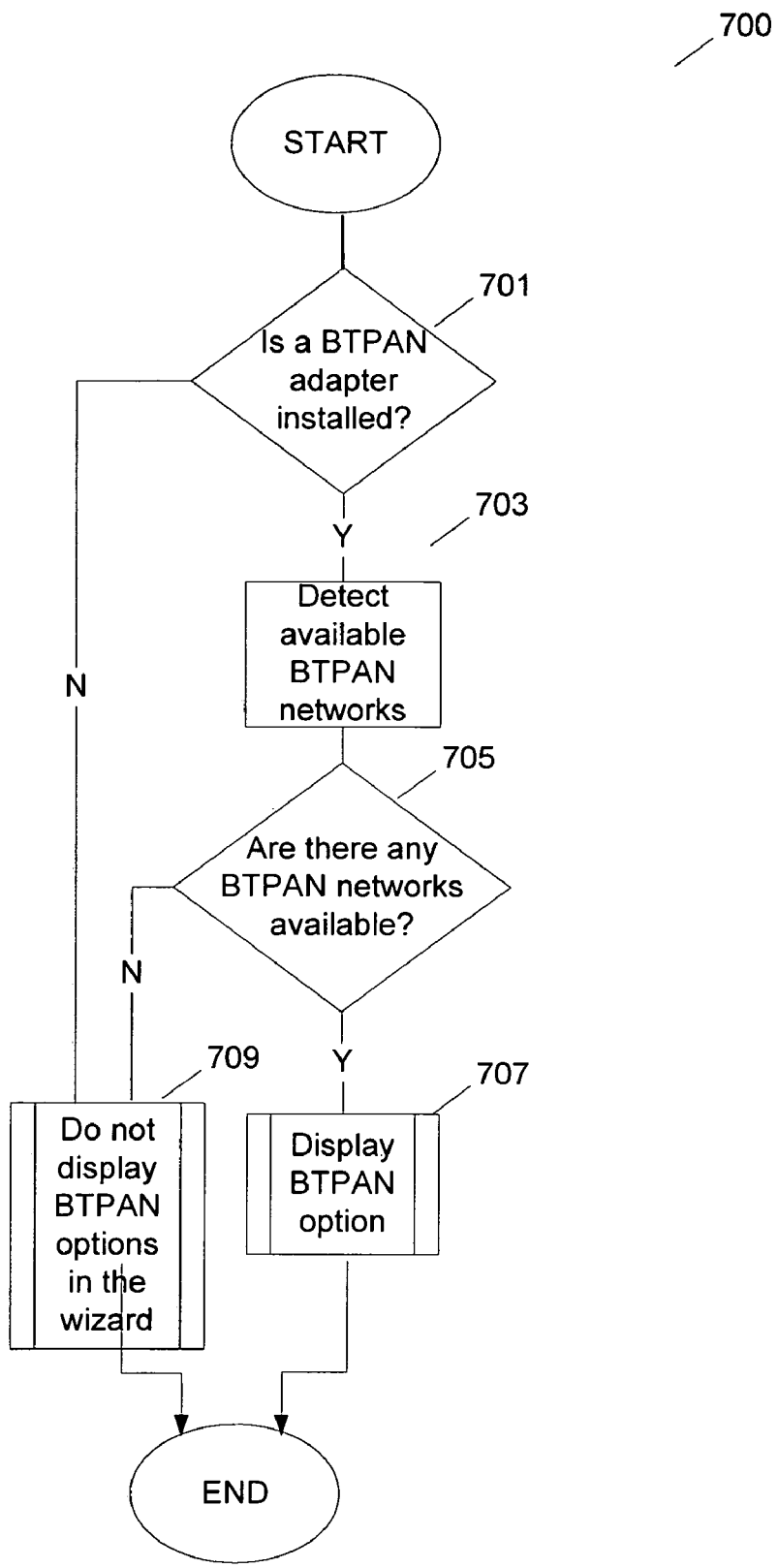
FIG. 7 is a flow chart illustrating a process used by the wizard for determining whether a Bluetooth PAN connection is possible according to an embodiment of the invention.

In FIG. 7, a process is illustrated for determining whether a Bluetooth PAN connection is possible. At step 701 of the flow chart 700, the wizard first determines whether a Bluetooth PAN (BTPAN) adapter is installed. If it is determined that a BTPAN adapter is not installed, the process flows to step 709, whereat the wizard does not display a BTPAN connection option to the user. Otherwise, the process flows to step 703, whereat the wizard attempts to detect available BTPAN networks. At decision 705, if at least one BTPAN network has been detected, the process flows to step 707, whereat the wizard displays a BTPAN connection option to the user. Otherwise, the process flows to step 709, whereat the wizard does not display a BTPAN connection option to the user.

Figure 11:
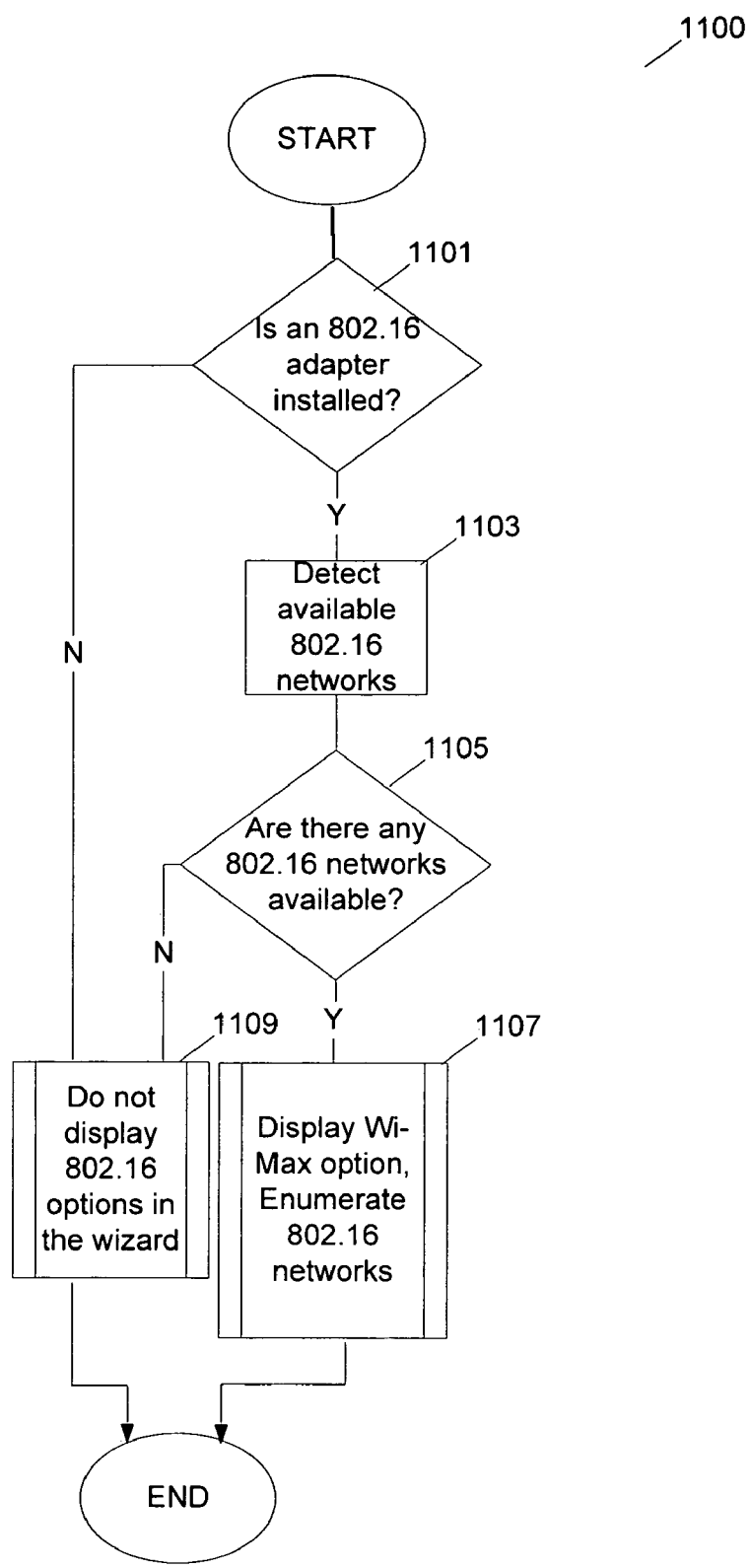
FIG. 11 is a flow chart illustrating a process used by the wizard for determining whether an 802.16 connection is possible according to an embodiment of the invention.

In FIG. 11, a process is illustrated for determining whether a Wi-Max (802.16) connection is possible. At step 1101 of the flow chart 1100, the wizard first determines whether an 802.16 adapter is installed. If it is determined that an 802.16 adapter is not installed, the process flows to step 1109, whereat the wizard does not display an 802.16 connection option to the user. Otherwise, the process flows to step 1103, whereat the wizard attempts to detect available 802.16 networks. At decision 1105, if at least one 802.16 network has been detected, the process flows to step 1107, whereat the wizard displays a Wi-Max connection option to the user and enumerates the detected 802.16 networks. Otherwise, the process flows to step 1109, whereat the wizard does not display an 802.16 connection option to the user.

Figure 8:
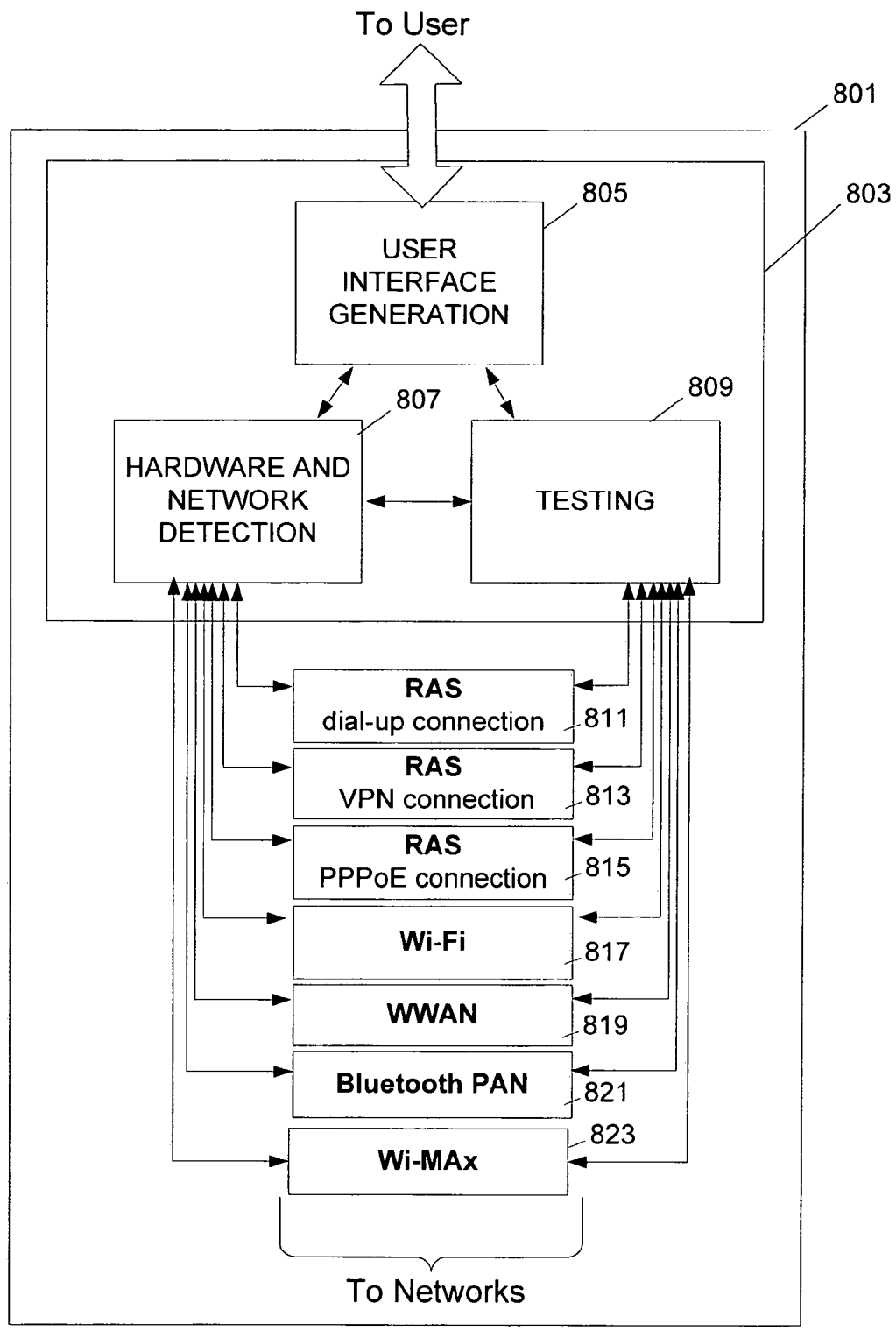
FIG. 8 is an architectural schematic showing the wizard and its components within a user machine according to an embodiment of the invention.

FIG. 8 illustrates an architectural schematic showing the wizard and its components within a user machine. In particular, the user machine is denoted by outline 801, while the wizard is denoted by outline 803. The wizard 803 includes a number of submodules including a user interface generation module 805, a hardware and network detection module 807, and a testing module 809. The modules 805, 807, 809 intercommunicate as will be described below. The user interface generation module 805 generates interface elements for viewing by a user, such as options lists, instructions, selection boxes or buttons, and so on. The user interface generation module 805 also receives input form the user via the user interface. Such information includes mouse clicks and selections, as well as keyboard commands in an embodiment of the invention.

The user machine 801 also generally contains a number of other elements, as will be described below. Other elements that may be present and are relevant here include a number of network connection modules 811, 813, 815, 817, 819, 821, and 823. These modules typically contain hardware, such as a network adapter card, as well as software, such as a driver. In an embodiment of the invention, the hardware and network detection module 807 and the testing module 809 communicate with the network connection modules 811, 813, 815, 817, 819, 821, and 823 via an appropriate driver as will be appreciated.

The network connection modules 811, 813, 815, 817, 819, 821, and 823 each support a different connection mechanism. The RAS Dial-up connection module 811, if present in conjunction with an appropriate available network, allows modem connectivity from the user machine 801. The RAS VPN connection module 813, if present in conjunction with an appropriate available network, allows VPN connectivity from the user machine 801. The RAS PPPoE connection module 815, if present in conjunction with an appropriate available network, allows PPPoE connectivity from the user machine 801. The WiFi connection module 817, if present in conjunction with an appropriate available wireless network, allows WiFi connectivity from the user machine 801. The WWAN connection module 819, if present in conjunction with an appropriate available wireless network, allows WWAN connectivity from the user machine 801. The Bluetooth PAN connection module 821, if present in conjunction with an appropriate available Bluetooth network, allows Bluetooth PAN connectivity from the user machine 801. Finally, the Wi-Max (802.16) connection module 823, if present in conjunction with an appropriate available 802.16 network, allows Wi-Max connectivity from the user machine 801.

The interactions among the components of the user machine 801 and the wizard 803 are as follows. The user interface generation module 805 presents a visual interface to the user of the machine 801 when the wizard is invoked and operational. The types of information displayed to the user include selectable connection options including a selectable manual connection option, configuration instructions, configuration results, diagnostic information, and so on.

The connection options are generated by the hardware and network detection module 807 in conjunction with the network connection modules 811, 813, 815, 817, 819, 821, and 823 of the user machine 801 as described above. Namely, the hardware and network detection module 807 verifies the existence of appropriate hardware and an appropriate network. The hardware and network detection module 807 passes the generated options to the user interface generation module 805 for display to the user.

Upon selection and configuration of a network connection option by the user via the user interface, the user interface generation module 805 passes the selection to the testing module 809, which uses the appropriate one of the network connection modules 811, 813, 815, 817, 819, 821, and 823 of the user machine 101 to verify the configured connection. To this end, the testing module 809, via an appropriate one of the network connection modules 811, 813, 815, 817, 819, 821, and 823, connects silently in the background, tests for Internet or other network connectivity, disconnects in the background, and reports success or failure to the user interface generation module 805. The user interface generation module 805 in turn gives the user a display indicating success or failure of the connection configuration.

Although the user device may be selected from a wide array of device types, a description of one type of computer in which various embodiments of the invention may be practiced is now provided. Many personal computers as well as other device types conform to this basic architecture. Although not required, embodiments of the invention are herein described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer" and "computing device" as used herein include any device that electronically executes one or more programs, such as personal computers (PCs), hand-held devices, multi-processor systems, microprocessor-based programmable consumer electronics, network PCs, minicomputers, tablet PCs, laptop computers, consumer appliances having a microprocessor or microcontroller, routers, gateways, hubs and the like. Embodiments of the invention may also be employed in distributed computing environments, where tasks are performed by remote processing devices that are linked through a communications network. In a distributed computing environment, programs may be located in both local and remote memory storage devices.

Figure 9:
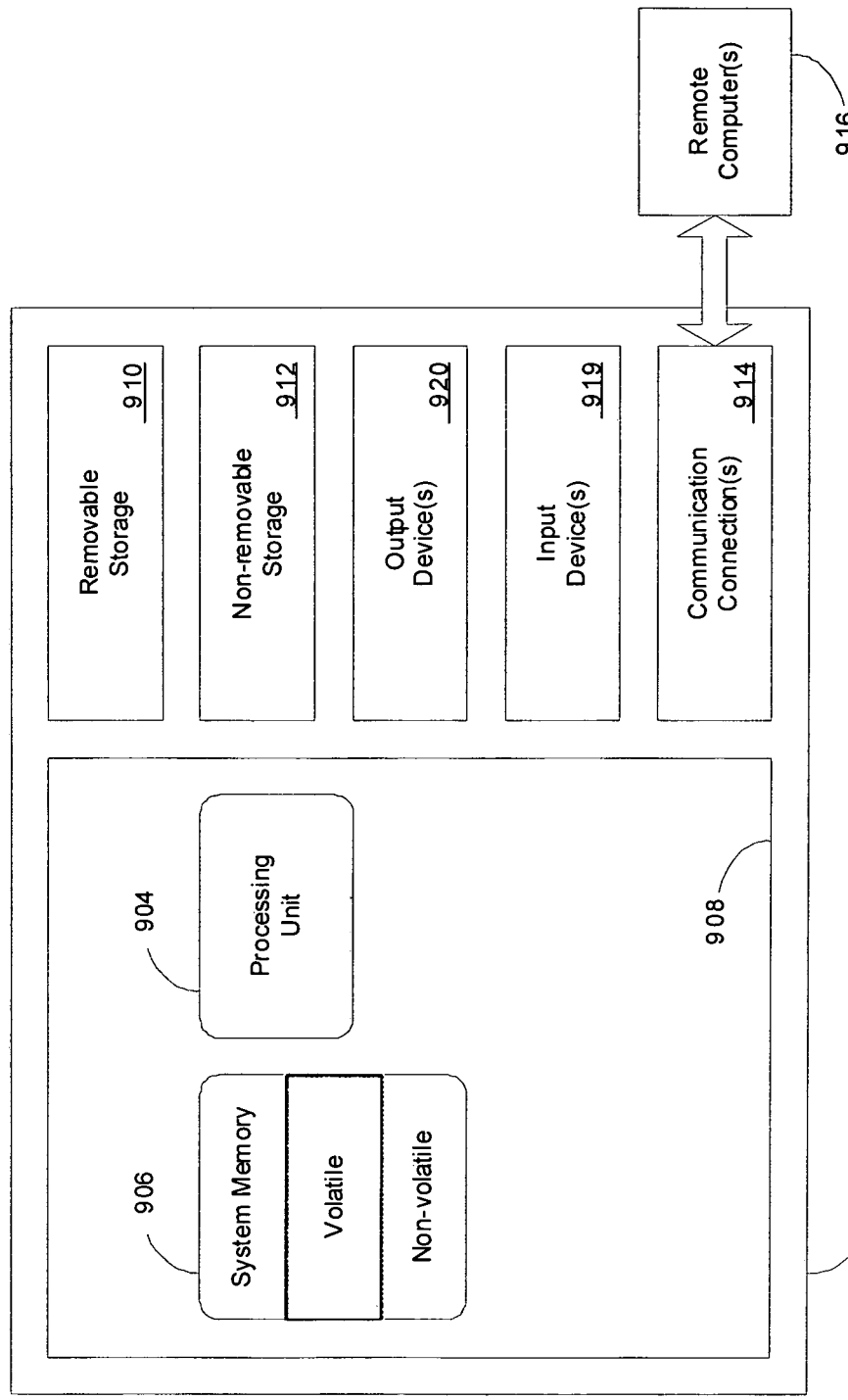
FIG. 9 is a schematic diagram generally illustrating an exemplary computer system usable to implement an embodiment of the invention.

Referring to FIG. 9, an example of a basic configuration for the computer 902 on which aspects of the invention described herein may be implemented is shown. In its most basic configuration, the computer 902 typically includes at least one processing unit 904 and memory 906. The processing unit 904 executes instructions to carry out tasks in accordance with various embodiments of the invention. In carrying out such tasks, the processing unit 904 may transmit electronic signals to other parts of the computer 902 and to devices outside of the computer 902 to cause some result. Depending on the exact configuration and type of the computer 902, the memory 906 may be volatile (such as RAM), non-volatile (such as ROM or flash memory) or some combination of the two. This most basic configuration is illustrated in FIG. 9 by dashed line 908.

The computer 902 may also have additional features/functionality. For example, computer 902 may also include additional storage (removable 910 and/or non-removable 912) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 902. Any such computer storage media may be part of computer 902.

The computer 902 preferably also contains communications connections 914 that allow the device to communicate with other devices such as remote computer(s) 916. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. The term "computer-readable medium" as used herein includes both computer storage media and communication media. Exemplary communications connections usable within embodiments of the invention include, but are not limited to, a dial-up connection, VPN connection, PPPoE connection, WiFi connection, WWAN connection and Bluetooth connection.

The computer 902 may also have input devices 918 such as a keyboard/keypad, mouse, pen, voice input device, touch input device, etc. Output devices 920 such as a display, speakers, a printer, etc. may also be included. All these devices are well known in the art and need not be described at length here.

Having described the connection wizard according to various embodiments of the invention, several usage scenarios will now be described. For the first example, assume that a person, Abby, would like to connect to the Internet via dial-up modem (RAS dial-up) using an existing account. Abby's new PC has a built in modem and Bluetooth adapter. Abby needs to set-up the new PC to access the Internet. Once Abby unpacks the computer and turns it on, she finds herself viewing a welcome screen which presents her with various options one of which is "Connect to the Internet". Abby selects this option and the wizard described above launches.

The wizard asks Abby if she already has an ISP to which she answers "yes." The wizard then checks Abby's PC to determine methods of connection and after a few seconds presents Abby with the choice of configuring either a Broadband or dial-up connection. Abby chooses dial-up and proceeds. The wizard then asks Abby for credentials for the connection and an ISP telephone number. Abby enters all of the information requested and hits a "next" selectable UI element. The wizard then builds and tests the connection. After a short period, the default browser launches allowing Abby to browse the Internet.

As a second example, consider the case of creating a broadband (DSL/Cable modem PPPoE) connection using an existing account. The example proceeds as above until the wizard presents Abby with the choice of configuring either a Broadband or dial-up connection. This time, Abby chooses Broadband and proceeds. The wizard then asks Abby for the credentials for the connection. Abby enters the information requested and hits "next." The wizard then builds and tests the connection. After a short period, Abby's default browser launches allowing Abby to browse the Internet.

As noted above, the wizard is also able to allow manual connection as in the following example. John is the administrator of a small business network. A new member of the sales team requires Internet access when they are at customer sites, and has requested help with configuration and set-up. John's company has a small business account with an ISP, so he can easily create and configure the connection. Unfortunately the user in question has left their PC card modem at home. Since the card is required to make a connection possible, the wizard will not display an option to create a dial-up connection.

John logs onto the laptop and launches the wizard. The wizard checks the laptop to determine methods of connection and after a few seconds, presents John with a list of options. As John does not see an option for configuring a dial-up connection he selects a manual configuration option such as denoted by the phrase "I'd prefer to use another way." John is then shown a list of every connection type from which he selects "Dial-up modem". John completes the wizard and shows the user how to use the RAS connection.

Figure 10:
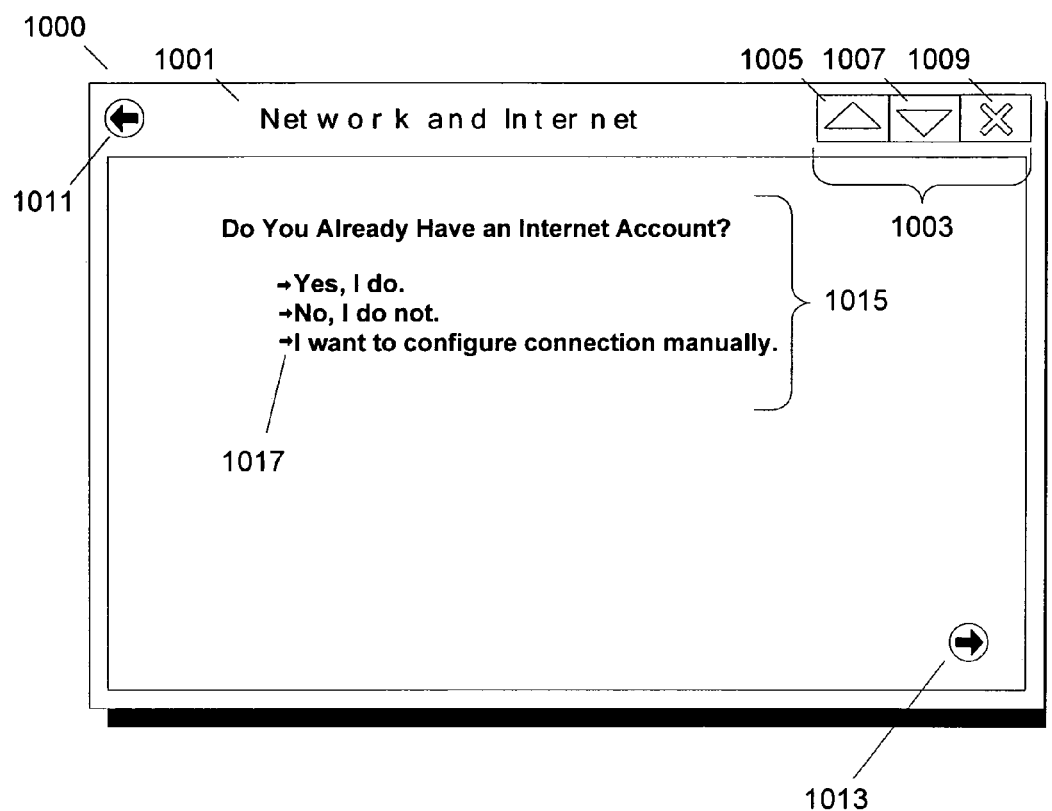
FIG. 10 is an illustration of an example user interface according to an embodiment of the invention.

A number of user interface types and configurations are usable within embodiment of the invention. For example, the wizard may host its own window or may be hosted within another program's or entity's windows, such as a browser, file system navigator. In addition, the wizard user interface preferably provides tools for easy navigation within the wizard as well as manipulation of the wizard's window. An example user interface according to an early stage of the connection process, after the wizard has been invoked, is shown in FIG. 10. The wizard is hosted in its own window 1000. The frame 1001 of the window 1000 comprises a number of configuration and navigation controls. For example, window manipulation tools 1003 are situated in the upper right hand corner of the frame 1001. The manipulation tools 1003 include window minimize 1005, window maximize 1007, and window close 1009 tools. The frame 1001 also contains selectable navigation arrows 1011, 1013 for moving to preceding or subsequent steps of the wizard respectively.

The frame contains within it information 1015, typically in textual form but possibly also including graphical or other information. The individual lines of information may be selectable, so as to cause the wizard to perform in the selected manner. For example, if the line "I want to configure connection manually" is selected by the user in this embodiment of the invention, then the wizard presents the UI elements to guide the user through manual configuration. Alternatively, or additionally, bullets or icons 1017 next to the lines may be selectable.

All references, including publications, patent applications, patents and appendices, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of configuring a new network connection from a user machine to a network, the method comprising:
    determining one or more network connections that are supportable by the user machine;
    presenting a list of network connection options to a user of the user machine, wherein the list of network connection options lists those network connections supportable by the user machine;
    receiving a user selection of a network connection option associated with a first network;
    configuring a connection from the user machine to the first network; and
    testing the connection created from the user machine to the first network comprising:
        attempting to make a connection in the background on the user machine to the first network;
        if the connection to the first network is successful, verifying network connectivity comprising submitting user credentials for the connection and verifying if the user credentials are accepted and that the first network is available for use without additional credentials; and
        if the network connectivity is verified, disconnecting the user machine from the first network in the background;
        if the connection is successful and verified, reporting the successful and verified connection as an available network; and
        if the connection is not successful or is not verified, refraining from reporting the connection-as an available network.

2. The method according to claim 1, wherein the step of determining one or more network connections that are supportable by the user machine comprises determining that the user machines comprises networking hardware appropriate for the one or more network connections.

3. The method according to claim 2, wherein the step of determining one or more network connections that are supportable by the user machine further comprises determining that one or more networks of a type usable with the one or more network connections are present.

4. The method according to claim 2, wherein the user can elect to manually configure a network connection not listed in the presented list of network connection options.

5. The method according to claim 1, wherein the step of presenting a list of network connection options to a user of the user machine further comprises presenting a manual connection option to the user, whereby the user can elect to manually configure a network connection.

6. The method according to claim 1, wherein the step of testing the connection created from the user machine to the first network further comprises notifying a user of the user machine of the status of the network connection.

7. The method according to claim 1, wherein the one or more network connections that are supportable by the user machine include a network of a type selected from the group consisting of Ethernet, 802.11, 802.16 (Wi-Max), GSM/CDMA, Bluetooth PAN, and dial-up.

8. A non-transitory computer-readable medium having thereon computer-executable instructions for performing a method of configuring a new network connection from a user machine to a network, the instructions comprising instructions for:
    determining one or more network connections that are supportable by the user machine;
    presenting a list of network connection options to a user of the user machine, wherein the list of network connection options lists those network connections supportable by the user machine;
    receiving a user selection of a network connection option associated with a first network;
    configuring a connection from the user machine to the first network; and
    testing the connection created from the user machine to the first network comprising:
        attempting to make a connection in the background on the user machine to the first network further comprising;
        if the connection to the first network is successful, verifying network connectivity comprising submitting user credentials for the connection and verifying if the user credentials are accepted and that the first network is available for use without additional credentials; and
        if the network connectivity is verified, disconnecting the user machine from the first network in the background;
        if the connection is successful and verified, reporting the successful and verified connection as an available network; and
        if the connection is not successful or is not verified, refraining from reporting the connection as an available network.

9. The non-transitory computer-readable medium according to claim 8, wherein the instructions for determining one or more network connections that are supportable by the user machine comprises instructions for determining that the user machines comprises networking hardware appropriate for the one or more network connections.

10. The non-transitory computer-readable medium according to claim 9, wherein the instructions for determining one or more network connections that are supportable by the user machine further comprise instructions for determining that one or more networks of a type usable with the one or more network connections are present.

11. The non-transitory computer-readable medium according to claim 9, wherein the user can elect to manually configure a network connection not listed in the presented list of network connection options.

12. The non-transitory computer-readable medium according to claim 8, wherein the instructions for presenting a list of network connection options to a user of the user machine further comprise instructions for presenting a manual connection option to the user, whereby the user can elect to manually configure a network connection.

13. The non-transitory computer-readable medium according to claim 8, wherein the instructions for testing the connection created from the user machine to the first network further comprise instructions for notifying a user of the user machine of the status of the network connection.

14. The non-transitory computer-readable medium according to claim 8, wherein the one or more network connections that are supportable by the user machine include a network of a type selected from the group consisting of Ethernet, 802.11, 802.16 (Wi-Max), GSM/CDMA, Bluetooth PAN, and dial-up.

15. A connection wizard for aiding a user of a user machine in configuring a connection from the user machine to a network comprising:
- a network and network hardware detection module for determining one or more network connection types supportable by the user machine;
- a user interface module in communication with the network and network hardware detection module for receiving notification of the one or more network connection types supportable by the user machine, and for generating a user interface presenting a listing of the one or more network connection types supportable by the user machine, and for receiving a user selection of a first network connection type to configure and for guiding the user via the user interface through a process for configuring a network connection of the first network connection type; and
- a testing module in communication with the user interface module, for receiving from the user interface module an indication that the configuration of a connection of the first network connection type has completed, and for testing the configured connection wherein testing the configured connection comprises:
  - attempting to make a connecting in background,
  - if the connection to the first network is successful,
    - verifying the connection in the background connectivity comprising submitting user credentials for the connection and verifying if the user credentials are accepted and that the first network is available for use without additional credentials,
  - if the network connectivity is verified,
    - disconnecting in the background,
  - if the connection is successful and verified,
    - reporting the successful and verified connection as an available network and
  - if the connection is not successful or is not verified,
  - refraining from reporting the connection as an available network.

16. The connection wizard according to claim 15, wherein testing the configured connection further comprises reporting the status of the connection to the user interface module for display to the user.

17. The connection wizard according to claim 15, wherein the one or more network connections supportable by the user machine include a network of a type selected from the group consisting of Ethernet, 802.11, 802.16 (Wi-Max), GSM/CDMA, Bluetooth PAN, and dial-up.

* * * * *